US008869194B2

(12) United States Patent
Yu et al.

(10) Patent No.: US 8,869,194 B2
(45) Date of Patent: Oct. 21, 2014

(54) METHODS, COMPUTER PROGRAM PRODUCTS, AND APPARATUS FOR PROVIDING TARGETED CONTENT BASED ON USER DATA

(75) Inventors: Ke Yu, Alpharetta, GA (US); William Brown, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 851 days.

(21) Appl. No.: 12/198,454

(22) Filed: Aug. 26, 2008

(65) Prior Publication Data

US 2010/0058382 A1 Mar. 4, 2010

(51) Int. Cl.

| | |
|---|---|
| ***H04N 7/10*** | (2006.01) |
| ***H04N 7/025*** | (2006.01) |
| ***G06Q 30/00*** | (2012.01) |
| ***H04N 21/234*** | (2011.01) |
| ***H04N 21/258*** | (2011.01) |
| ***H04N 21/84*** | (2011.01) |
| ***H04N 21/472*** | (2011.01) |
| ***H04N 7/173*** | (2011.01) |
| ***H04N 21/81*** | (2011.01) |
| ***H04N 21/44*** | (2011.01) |
| ***H04N 21/433*** | (2011.01) |
| ***H04N 21/8547*** | (2011.01) |
| ***H04N 21/231*** | (2011.01) |

(52) U.S. Cl.

CPC ..... *H04N 7/17318* (2013.01); *H04N 21/23418* (2013.01); *H04N 21/25891* (2013.01); *H04N 21/84* (2013.01); *H04N 21/47202* (2013.01); *H04N 21/25883* (2013.01); *H04N 21/812* (2013.01); *H04N 21/44016* (2013.01); *H04N 21/4331* (2013.01); *H04N 21/8547* (2013.01); *H04N 21/23424* (2013.01); *H04N 21/23106* (2013.01)

USPC .................. 725/32; 725/34; 725/35; 725/36; 705/14.49

(58) Field of Classification Search

None

See application file for complete search history.

(56) References Cited

U.S. PATENT DOCUMENTS

| | | | | |
|---|---|---|---|---|
| 7,720,432 | B1 | 5/2010 | Colby et al. | |
| 8,260,665 | B2 * | 9/2012 | Foladare et al. | 705/14.5 |
| 2004/0158858 | A1 * | 8/2004 | Paxton et al. | 725/42 |
| 2008/0201734 | A1 * | 8/2008 | Lyon et al. | 725/34 |
| 2008/0250448 | A1 * | 10/2008 | Rowe et al. | 725/32 |
| 2008/0263583 | A1 * | 10/2008 | Heath | 725/32 |
| 2008/0276270 | A1 * | 11/2008 | Kotaru et al. | 725/34 |
| 2008/0320531 | A1 * | 12/2008 | Kim et al. | 725/87 |
| 2009/0282433 | A1 * | 11/2009 | Petta | 725/32 |
| 2010/0175080 | A1 * | 7/2010 | Yuen et al. | 725/32 |
| 2010/0306249 | A1 | 12/2010 | Hill et al. | |
| 2011/0047567 | A1 * | 2/2011 | Zigmond et al. | 725/32 |

* cited by examiner

*Primary Examiner* — Nasser Goodarzi
*Assistant Examiner* — Fred Peng
(74) *Attorney, Agent, or Firm* — Cantor Colburn LLP

(57) ABSTRACT

Targeted content associated with user information stored in a database within a network in communication with a user device is received along with program content. A determination by a scanning process is made at what position or at what time in the program content to include the targeted content. The program content and the targeted content are rendered, with the targeted content included at the determined position or time in the program content, for presentation to at least one user. This rendering may occur within a network or within a user device.

15 Claims, 6 Drawing Sheets

110 Scanning Module
115 User Information Database
120 Targeted Content Database
130 Rendering Module
140 Program Content Database
150 OSS
160 Network
170a User Device A
174a Display
178a Application Interface Agent A
170b User Device B
174b Display
178b Application Interface Agent B
190 Gateway
195 IPTV Infrastructure

METHODS, COMPUTER PROGRAM PRODUCTS, AND APPARATUS FOR PROVIDING TARGETED CONTENT BASED ON USER DATA

BACKGROUND

Exemplary embodiments relate generally to content delivery, and, in particular, to delivery of targeted content.

In advertising, it is considered highly desirable to target advertisements and other promotional offers to specific users/consumers rather than to broadcast advertisements to a general audience. By targeting advertising to individual users, the likelihood may be increased that a user will view and act upon the advertisement. Unfortunately, obtaining information sufficient to target advertising has proven to be difficult.

With the advent of Internet Protocol Television (IPTV), targeted advertising has become increasingly attractive. IPTV is a digital television delivery service in which a digital television signal is delivered to users via a computer network infrastructure using the Internet Protocol. Typically, IPTV services are bundled with additional Internet services, such as Internet web access and voice over Internet protocol (VOIP). An IPTV user typically has a set top box connected to (or incorporated within) his or her television for the reception of a digital signal. Used in conjunction with an IP-based platform, a set top box allows for a user to access an IPTV service and any additional services that are integrated within the IPTV service. IPTV service platforms allow for an increase in the interactive services that can be provided to users. As such, a user can have access to a wide variety of content that is available via the IPTV service or the Internet, including content, such as advertising, tailored specifically for the user. A challenge in making such content available is to target the content to the user based on the user information without requiring a major alteration to the user's communication device. Also, it would be desirable to conserve network bandwidth consumed by delivering targeted ads.

BRIEF SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter. This description provides tools and techniques for delivering targeted content to users. According to various embodiments described herein, targeted content associated with user information stored in a database within a network in communication with one or more user devices is received, along with program content which is delivered by either unicast steams (in VOD, long tail video, etc) or multicast or broadcast (live TV show over IP or cable network). A determination is made at what position or at what time in the program content to include the targeted content. The targeted content is rendered at the determined position or time in the program content and presented to the user. Rendering may occur in the network or in the user device.

Other methods, computer program products, and or devices according to embodiments will be or become apparent to one with skill in the art upon review of the following drawings and Detailed Description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The Detailed Description explains various exemplary embodiments, together with advantages and features, by way of example with reference to the drawings.

DETAILED DESCRIPTION OF EXEMPLARY EMBODIMENTS

One or more exemplary embodiments are described below in detail. The disclosed embodiments are intended to be illustrative only, since numerous modifications and variations therein will be apparent to those of ordinary skill in the art.

According to exemplary embodiments, targeted content is received by at least one user device based on user information stored in network in communication with the user device. According to one embodiment, the targeted content and the program content are rendered in the network and unicast to multiple ser devices. This avoids alteration to the user device. According to another embodiment, program content is broadcast to multiple users, and the targeted content and the program content are rendered in the user device. By rendering the targeted content and the program content in the user device, network bandwidth is conserved.

In the description that follows, the terms advertisement, ad, and targeted content are used interchangeably to represent targeted content. Such targeted content is not limited to an advertisement but may include other content, such as a notice, webpage content, a logo, an offer, an alert, etc. Further, such content may be video, audio, or a combination of both. Thus, according to exemplary embodiments, the rendering of targeted content in program content described below includes not only preparing video data for display but also preparing audio, video, and audio/video data for presentation to a user.

Figure 1:
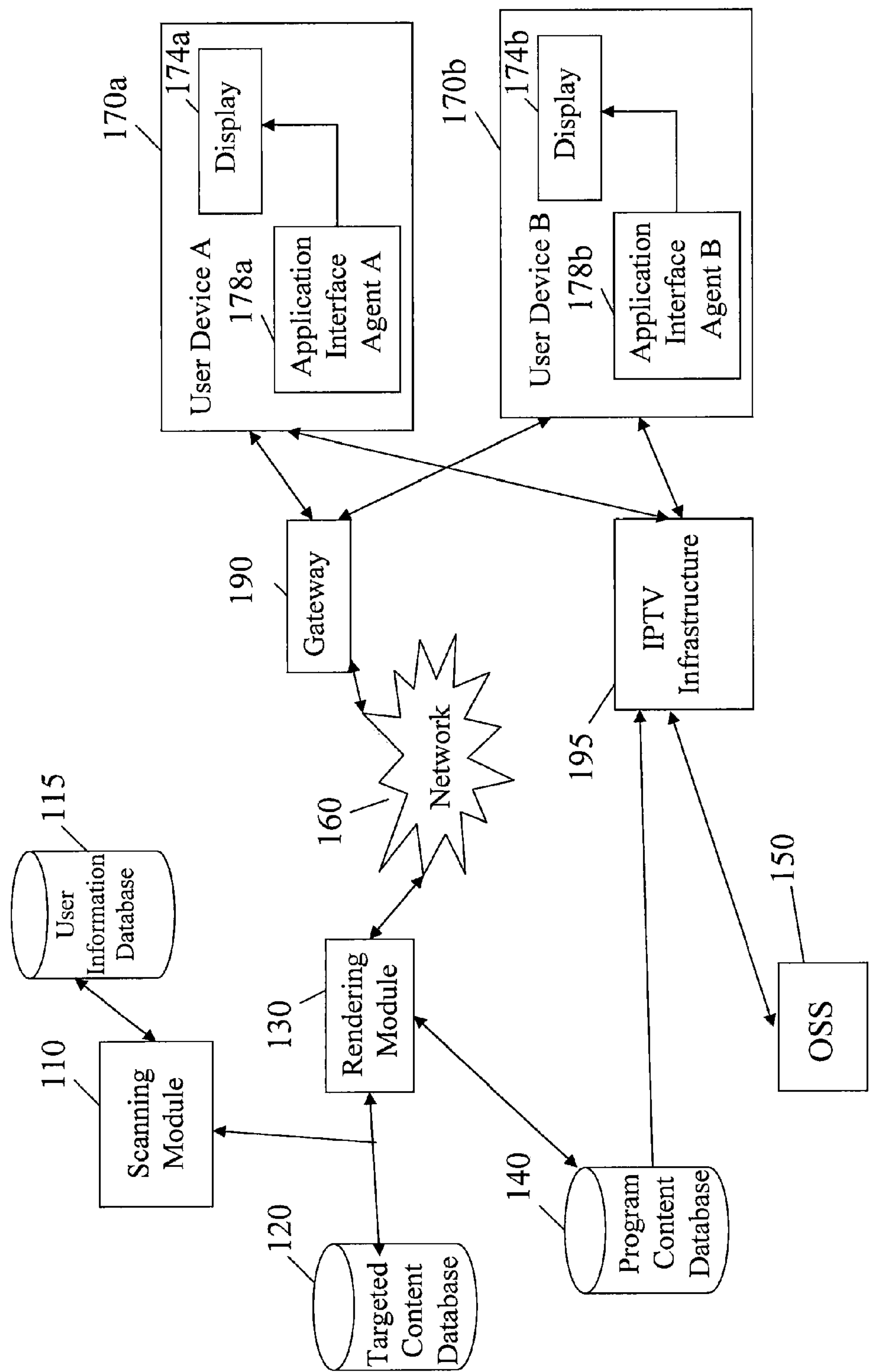
FIG. 1 is an illustration of a communication environment in which targeted content may be delivered in accordance with an exemplary embodiment.

FIG. 1 shows a communication environment in which targeted content is received by at least one user device according to an exemplary embodiment. The environment shown in FIG. 1 is an IPTV environment. However, it should be appreciated that targeted content may be delivered in a similar manner as described herein in other environments, e.g., broadband cable environments and cellular environments.

In an IPTV environment, such as that shown in FIG. 1, an IPTV gateway 190 serves as a conduit for data that is received from and transmitted to one or more networks outside of the IPTV environment, such as a network 160. The network 160 may include one or more networks suitable for delivery of content to the IPTV gateway 190, such as a cable network, a cellular network, or the Internet. Although the components shown to the left of the network 160 are depicted as distinct from the network 160, one or more of these components may be included in the network 160 or in one or more other networks in communication with the network 160. As those skilled in the art will appreciate, the IPTV environment may also comprise an IPTV infrastructure 195 in communication with tone or more user devices 170*a*, 170*b* and the gateway 190. Although two user devices 170*a*, 170*b* are shown in FIG. 1 for simplicity of illustration, it should be appreciated that targeted advertising as described herein may be provided to any number of user devices. The user devices 170*a*, 170*b* may each include a set top box or any other type of suitable communication device for receiving targeted content, such as a cellular telephone, a personal digital assistant, a personal computer or other device connected via wireline or wireless connections to a network for receiving program content and targeted content.

For an IPTV environment, such as that shown by example in FIG. 1, media content may be managed and delivered to a plurality of user communication devices, such as the user devices 170*a*, 170*b*. Management of content delivery may be performed by an Operations Support System (OSS) 150. The OSS 150 is a backend operation support system. According to exemplary embodiments, for services such as IPTV, the OSS 150 plays a vital role in maintaining and administering network control, including provisioning, blackout management, video recording, subscriber management, notification.

According to an exemplary embodiment, various communication and transmission protocols may be implemented to accomplish wired (e.g., telephonic communication, cable communication, and power line communication) and wireless (e.g., Bluetooth, WiFi, Ultra-wideband, and satellite transmission) communication and data transmission between the user devices 170*a*, 170*b* and the IPTV infrastructure 195.

When a user accesses the IPTV environment, the device user may log into the IPTV infrastructure 195 via a user interface (UI) that may be displayed at one of displays 174*a*, 174*b* connected to or incorporated within one of the user devices 170*a*, 170*b*.

User information, including, e.g., demographic information and application activity usage may be captured and stored in the network in a user information database 115. The user information may include viewing patterns (e.g., what actors a user likes to see and what programs a user likes to see) and interactive programming guide/electronic programming guide (IPG)/(EPG) data. The user information may also include other user-related information, including, e.g., address, zip code, city, and income level. This user information may be initially stored in the user database 115 when the user subscribes to a service that provides targeted advertising. The user information may be updated by obtaining information from application interface agents 178*a*, 178*b* in the user devices 170*a*, 170*b*, respectively, as described in further detail below.

According to an exemplary embodiment, a scanning module 110 is in communication with a targeted content database 120 containing content to be sent to targeted users based on user information stored in the user information database 115. The scanning module 110 may also communicate with the application interface agents 178*a*, 178*b* in the user devices 170*a*, 170*b*, respectively, to obtain additional user information that may be updated based on usage of the user devices 170*a*, 170*b* or based on user input. This communication may occur, e.g., periodically or during periods of low network usage. According to an exemplary embodiment, this communication occurs via the network 160, the gateway 190 and the IPTV infrastructure 195. The scanning module 110 may store this additional user information in the user information database 115.

According to an exemplary embodiment, the scanning module 110 looks for certain demographic and other user-related information stored in the user information database 115. Certain user data is associated with or deemed relevant enough to certain ads and other targeted content such that an advertiser or other targeted content provider would find it worthwhile to deliver certain targeted content to a user. For example, an advertisement for pick-up trucks may be targeted to users in a rural environment, while advertisements for small cars may be targeted to users in a city environment.

According to an exemplary embodiment, the scanning module 110 polls the user information database 115 to obtain demographic and other user-related information. The scanning module 110 may contain rules for matching data stored in the user information database 115 with user data associated with targeted ads and other targeted content stored in the targeted content database 120. This polling and matching may be performed at any time, e.g., on a periodic basis, late at night or during non-peak hour (so as not to adversely impact available network bandwidth). If the demographic or other user-related information obtained from the user information database 115 matches the user information associated with the advertisement (or other targeted content) stored in the targeted content database 120, the advertisement or other targeted content may be "pushed" from the targeted content database 120 to a rendering module 130.

Program content is also delivered as unicast stream (such as Video On Demand, long tail content, etc) to the rendering module 130 from a program content database 140. According to an exemplary embodiment, the rendering module 130 determines when/where during the program content to insert or overlay targeted content.

For example, targeted content may include a logo for a tennis shoe brand, such as the NIKE "swish". The logo may then be inserted by the rendering module 130 during a sports program, such as a basketball tournament. The information indicating when/where to insert or overlay the ad may be part of the ad metadata that may be stored in the rendering module 130. The rendering module 130 may be an application hosted by a device, such as a server. According to an exemplary embodiment, the rendering module 130 determines where/when to insert the ad based on the ad metadata. A graphics processor may be included in the rendering module 130 for rendering an advertisement onto/in a program. The rendering module 130 may render targeted content into program content in a custom manner, depending on the user preferences for each user stored in the user information database 115. The programs with the ads overlaid or inserted are delivered via unicasting to each user device 170*a*, 170*b* via the network 160, such that each user device receives a custom rendered program with content targeted to the particular user device. In an IPTV environment, the communication further passes through the gateway 190 and the IPTV infrastructure 195.

The application interface agents 178*a*, 178*b* receive the rendered program content including the targeted content and present it to, e.g., the displays 174*a*, 174*b*. Although depicted as integrated in the same device as the user devices 170*a*, 170*b*, the displays 174*a*, 174*b* may be separate devices. In this manner, the program with the inserted or overlaid ad is displayed or otherwise presented to the user.

Also, although the displays 174*a*, 174*b* are shown in FIG. 1 for simplicity of illustration, it should be appreciated that the targeted content may be provided "rendered" for presentation on another type of device, e.g., played by an audio device, such as a speaker.

According to some embodiments, a determination may be made by the rendering module 130 at what position during a program to insert targeted content. For example, a determination may be made when a network logo disappears in a program. This is the point during the program during which a broadcast advertisement may typically be shown. According to an exemplary embodiment, the targeted content may be inserted at this point in the program, replacing the broadcast advertisement. This is described in more detail below with reference to FIG. 5B.

According to other embodiments, the targeted content may be inserted or overlaid during the program at a particular time, whenever the program is playing, or during a certain time period during the program. This insertion may be based on time codes included in the program content, as explained in further detail below with reference to FIG. 5C.

The application interface agents 178*a*, 178*b* may report to the scanning module 110 that an ad or other targeted content was inserted or overlaid during a program. This may be performed by a reporting module included in the application interface agents 178*a*, 178*b* or in a separate module. Advertisers and other targeted content providers may be charged for advertising based on the reported data. For example, the advertisers/targeted content providers may be charged a flat rate or charged for each time an ad is inserted. The scanning module 110 may be provided by a network service provider or may be a third party vendor that acts as an agent to deliver targeted content. To maintain user privacy, the reporting module may perform "generic reporting", i.e., report what program the ad or targeted content was included in but not report what advertisement or specific targeted content was inserted. There may be varying levels of privacy involved in reporting. For example, reports may indicate when during a program an ad/targeted content is included, where in the program the ad/targeted content is included or both.

Figure 2:
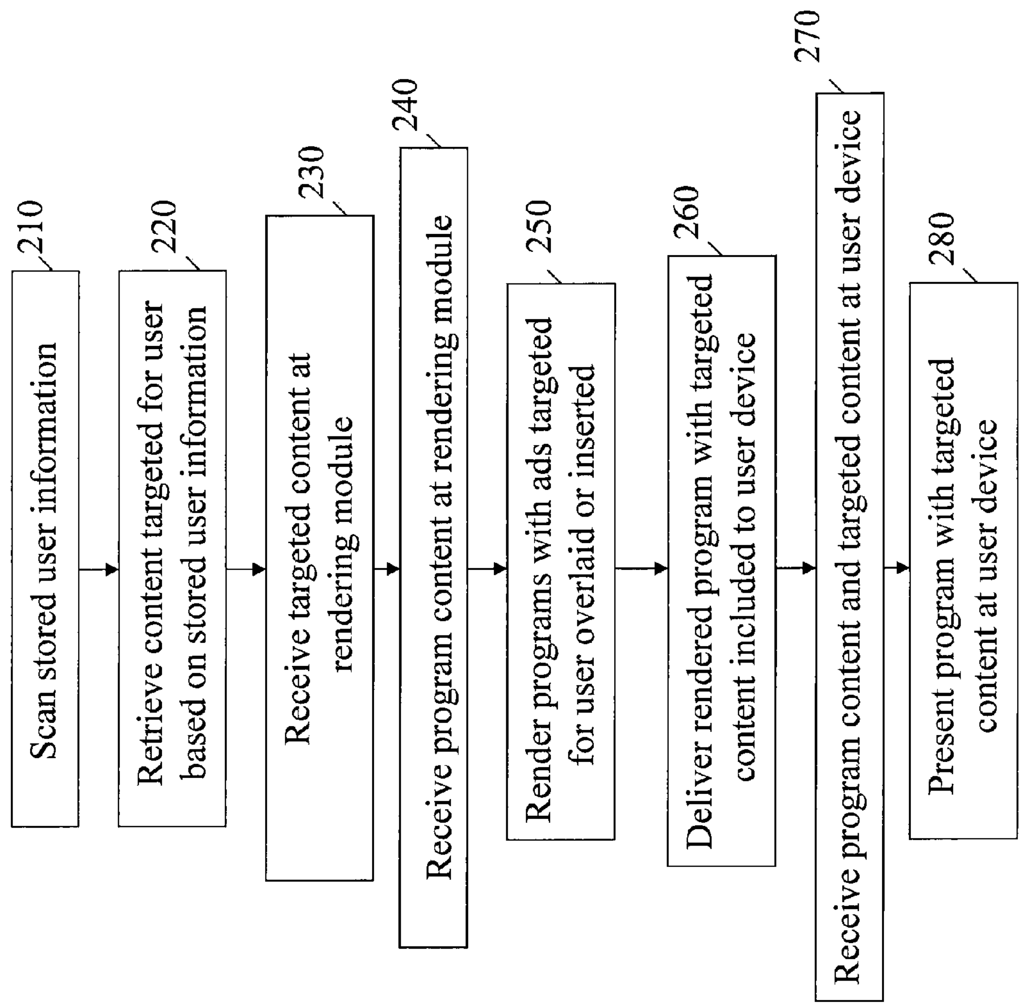
FIG. 2 is a flow diagram illustrating a process for delivering targeted content with program content in accordance with an exemplary embodiment.

FIG. 2 illustrates a method for delivering targeted content to at least one user according to an exemplary embodiment. At step 210, user information stored in, e.g., the user information database 115, is scanned or polled by the scanning module 110. The scanning module 110 looks for certain information stored in the database 115 that matches specific user information associated with certain ads and/or other targeted content stored in the targeted content database 120. The scanning module 110 retrieves ads and/or other targeted content from the targeted content database 120 at step 220. The ads and/or other targeted content retrieved are those with associated user information matching the user information stored in the user information database 115. At step 230, the scanning module 110 delivers the ads/targeted content to the rendering module 130. At step 240, the rendering module 130 receives unicast program content stream from the program content database 140. At step 250, the rendering module 130 renders the program content with the targeted content included. This rendering is accomplished by determining when/where during the program to include the targeted content. At step 260, the rendering module 130 delivers the program with the targeted content included to various user devices 170*a*, 170*b*, etc. via the network 160, and, if appropriate, the IPTV gateway 190 and IPTV infrastructure 195. In this manner, the rendering module 130 may render the same program content with different targeted ads, suited for each user device based on user information stored in the user information database 115 that is associated with the user device. At step 270, the program with the targeted content is received at the user devices 170*a*, 170*b*. At step 280, the program with the targeted content is presented to the users via, e.g., the displays 174*a*, 174*b*.

It should be appreciated that the order of steps shown in FIG. 2 is one example of how targeted content may be rendered and received. For example, programs may be received at the rendering module before targeted content is received.

Figure 3:
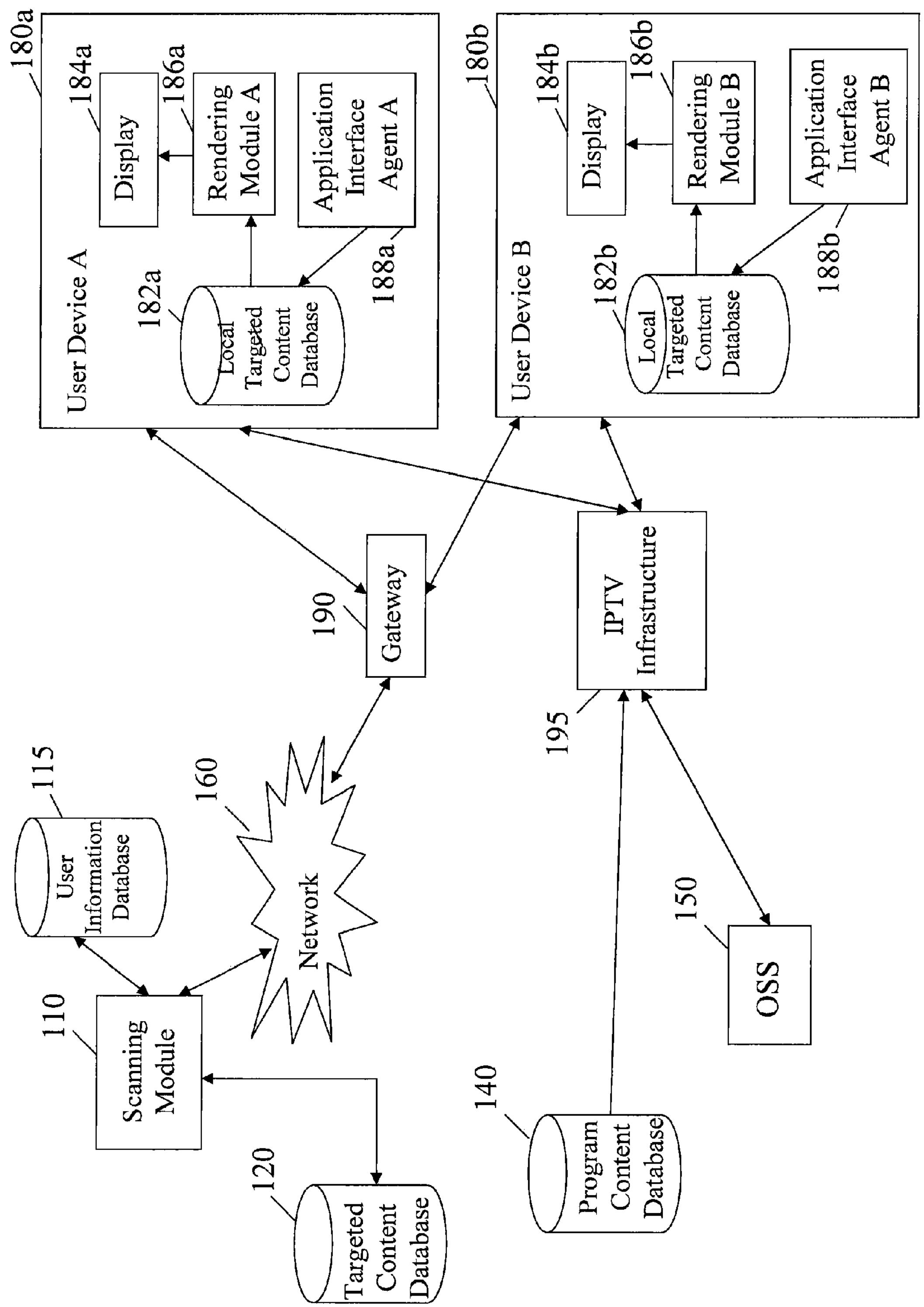
FIG. 3 is an illustration of a communication environment in which targeted content may be delivered in accordance with another exemplary embodiment.

FIG. 3 illustrates a communication environment in which targeted content is received by at least one user device according to another exemplary embodiment. The environment shown in FIG. 3, like that depicted in FIG. 1, is an IPTV environment. However, it should be appreciated that targeted content may be delivered in a similar manner as described herein in other environments, e.g., broadband cable environments and cellular environments.

In an IPTV environment, such as that shown in FIG. 3, the IPTV gateway 190 serves as a conduit for data that that is received from and transmitted to one or more networks outside of the IPTV environment, such as the network 160. As in the IPTV environment shown in FIG. 1, although the components shown to the left of the network 160 are depicted as distinct from the network 160, one or more of these components may be included in the network 160 or in one or more other networks in communication with the network 160. The network 160 may include one or more networks suitable for delivery of content to the IPTV gateway 190, such as a cable network, a cellular network, or the Internet. As those skilled in the art will appreciate, the IPTV environment may also comprise the IPTV infrastructure 195 in communication with one or more user devices 180*a*, 180*b* and the gateway 190. The user devices 180*a*, 180*b* may each include a set top box or any other type of suitable communication device for receiving targeted content, such as a cellular telephone, a personal digital assistant, a personal computer or other device connected via wireline or wireless connections to a network for receiving program content and targeted content.

For an IPTV environment, such as that shown by example in FIG. 3, media content may be managed and delivered to a plurality of user communication devices, such as the user devices 180*a*, 180*b*. Management of content delivery may be performed by the OSS 150, as explained above with reference to FIG. 1.

According to an exemplary embodiment, various communication and transmission protocols may be implemented to accomplish wired (e.g., telephonic communication, cable communication, and power line communication) and wireless (e.g., Bluetooth, WiFi, Ultra-wideband, and satellite transmission) communication and data transmission between the user devices 180*a*, 180*b* and the IPTV infrastructure 195.

When a user accesses the IPTV environment, the user may log into the IPTV infrastructure 195 via a UI that may be displayed at display 184*a*, 184*b* connected to or incorporated within the user devices 180*a*, 180*b*.

In a manner similar to that described above with reference to FIG. 1, user information, including demographic information, and application activity usage, may be captured and stored in the user information database 115. The user information may include viewing patterns (e.g., what actors a user likes to see and what programs a user likes to see) and interactive programming guide/electronic programming guide (IPG)/(EPG) data. The user information stored in the user information database 115 may also include other user-related information, including, e.g., address, zip code, city, and income level. This user information may be updated by obtaining information from application interface agents 188*a*, 188*b* as described in further detail below.

According to an exemplary embodiment, the scanning module 110 is in communication with the targeted content database 120 containing content to be sent to targeted users based on user information stored in the user information database 115. The scanning module 110 may also communicate with the application interface agents 188*a*, 188*b* in the user devices 180*a*, 180*b* to obtain additional user information in a manner similar to that described above with reference to FIG. 1. According to an exemplary embodiment, this communication may occur via the network 160, the gateway 190 and the IPTV infrastructure 195. The scanning module 110 may store this additional user information in the user information database 115.

According to an exemplary embodiment, the scanning module 110 looks for certain demographic and other user-related information stored in the user information database 115. As described above with reference to FIG. 1, certain user data is associated or deemed relevant enough to certain ads and other targeted content such that an advertiser or other targeted content provider would find it worthwhile to deliver certain targeted content to a user.

According to an exemplary embodiment, the scanning module 110 polls the user information database 115 to obtain demographic and other user-related information. The scanning module 110 may contain rules for matching data stored in the user information database 115 with user data associated with targeted ads and other targeted content stored in the targeted content database 120. This polling and matching may be performed at any time, e.g., on a periodic basis, late at night or during non-peak hour (so as not to adversely impact available network bandwidth). If the demographic or other user-related information obtained from the local user information database 115 matches the user information associated with the advertisement (or other targeted content) stored in the targeted content database 120, the advertisement or other targeted content may be "pushed" from the targeted content database 120 to the user devices 180*a*, 180*b* via the scanning module 110, the network 160, and the IPTV gateway and infrastructure 190, 195, if appropriate. The targeted content may be pushed to the application interface agents 188*a*, 188*b* in the user devices 180*a*, 180*b* associated with information that matches user information associated with the targeted content. The application interface agents 188*a*, 188*b*, in turn, deliver the ads or other targeted content to local targeted content databases 182*a*, 182*b*, where this information is stored locally in the user devices 180*a*, 180*b*. Thus, each user device 180*a*, 180*b* receives targeted content information suited for the user, based on user information stored in the user information database 115.

Program content is also delivered to the user devices 180*a*, 180*b* from the program content database 140 via the network 160 and the IPTV gateway 190 and IPTV infrastructure 195, if appropriate. This program content may be broadcast not only to the user devices 180*a*, 180*b* but also to multiple other devices. According to an exemplary embodiment, the program content is delivered to the application interface agents 188*a*, 188*b* which, in turn, stores the program content in the local databases 182*a*, 182*b*, According to an exemplary embodiment, rendering modules 186*a*, 186*b* included in the user devices 180*a*, 180*b* determine what program content to present to the displays 184*a*, 184*b* (or other appropriate devices) and when/where during the program content to insert or overlay targeted content.

The information indicating when/where to insert or overlay the ad may be part of the ad metadata that may be stored in the local targeted content databases 182*a*, 182*b*. The rendering modules 184*a*, 184*b* may determine where/when to insert the ad based on the ad metadata. A graphics processor may be included in each rendering module 184*a*, 184*b* for rendering an advertisement onto/in a program. The programs with the ads overlaid or inserted are delivered to the displays 184*a*, 184*b*, which may be integrated into the same devices as the user devices 180*a*, 180*b*, respectively, or may be separate devices. The programs with the inserted or overlaid ad are displayed to the users. Rendering the program content with the targeted content in the user device 180*a*, 180*b* conserves network bandwidth, as program content can be broadcast to each user device.

Although the displays 184*a*, 184*b* are shown in FIG. 3 for simplicity of illustration, it should be appreciated that the targeted content may be "rendered" to other types of devices, e.g., played by an audio device, such as a speaker.

According to some embodiments, a determination may be made by the rendering module 186*a*, 186*b* at what position during programs to insert targeted content in a manner similar to that described above with reference to FIG. 1. According to other embodiments, the targeted content may be inserted or overlaid during the program at a particular time, whenever the program is playing, or during a certain time period during the program as described above with reference to FIG. 1.

The application interface agents 188*a*, 188*b* may report to the scanning module 110 that an ad or other targeted content was inserted or overlaid during a program. This may be performed by reporting modules included in each of the application interface agents 188*a*, 188*b* or in a separate module. Advertisers and other targeted content providers may be charged for advertising based on the reported data. For example, the advertisers/targeted content providers may be charged a flat rate or charged for each time an ad is inserted. The scanning module 110 may be provided by a network service provider or may be a third party vendor that acts as an agent to deliver targeted content. To maintain user privacy, the reporting modules may perform "generic reporting", i.e., report what program the ad or targeted content was included in but not report what advertisement or specific targeted content was inserted. There may be varying levels of privacy involved in reporting. For example, reports may indicate when during a program an ad/targeted content is included, where in the program the ad/targeted content is included or both.

Figure 4:
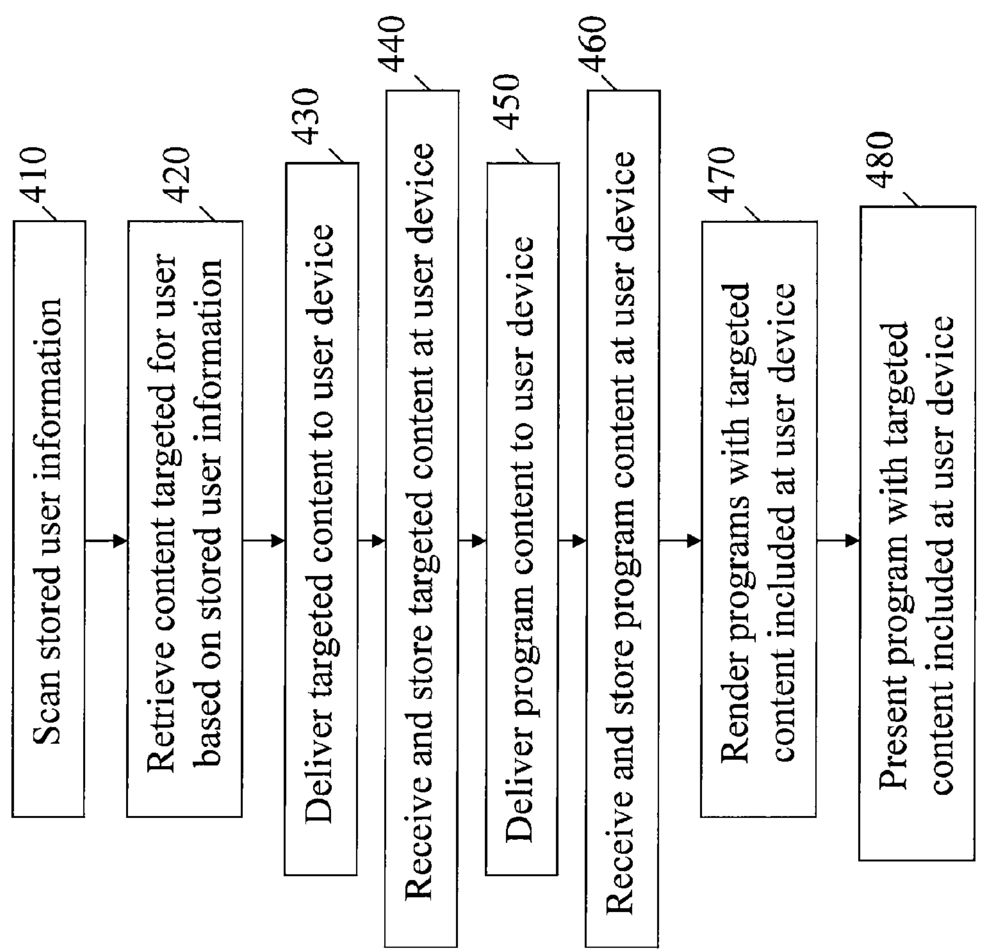
FIG. 4 is a flow diagram illustrating a process for delivering targeted content with program content in accordance with another exemplary embodiment.

FIG. 4 illustrates a method for delivering targeted content to at least one user according to an exemplary embodiment. Similar to the method shown in FIG. 2, at step 410, user information stored in the user information database 115 is scanned or polled by the scanning module 110. The scanning module 110 looks for certain information stored in the database 115 that matches specific user information associated with certain ads and/or other targeted content stored in the targeted content database 120. The scanning module 110 retrieves ads and/or other targeted content from the targeted content database 120 at step 420. The ads and/or other targeted content retrieved are those with associated user information matching the user information stored in the user information database 115.

At step 430, the scanning module 110 delivers the ads/targeted content to the user devices 180*a*, 180*b*. The targeted content may be delivered via the network 160 and IPTV gateway and infrastructure 190, 195, if appropriate. At step 440, the user devices 180*a*, 180*b* receive and store the ads/targeted content. The ads/targeted content may be received by the application interface agents 188*a*, 188*b*, which, in turn, deliver the ads/targeted content to the local targeted content databases 182*a*, 182*b*. At step 450, program content from the program content database 140 is delivered to the user devices 180*a*, 180*b*. The program content may be received by the application interface agents 188*a*, 188*b* and then stored locally in the databases 182*a*, 182*b* or some other database at step 460. At step 470, the rendering modules 186*a*, 186*b* render the program content with the targeted content included for presentation by the displays 184*a*, 184*b* (or other appropriate devices). This rendering is accomplished by determining when/where during the program to include the targeted content. At step 480, the program with the included ad/targeted content is displayed (or presented in some other appropriate manner, e.g., as an audio signal) to the user. In this manner, program content may be broadcast to multiple users devices, with content targeted for each user included with the program content when the program is rendered for presentation to the user.

It should be appreciated that the order of steps shown in FIG. 4 is one example of how targeted content may be delivered, received, and rendered. For example, programs may be received and stored at the user device before targeted content is received. The program may be played back at a later time with the targeted content included.

Figure 5A:
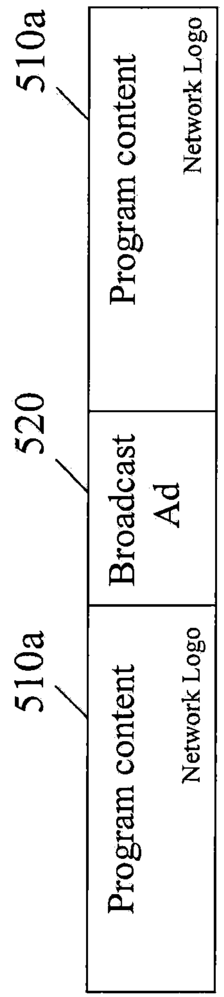
FIG. 5A illustrates an example of how broadcast advertisements have traditionally been included in program content.

FIG. 5A illustrates how advertisements were traditionally inserted in program content. As can be seen from FIG. 5A, program content 510*a* often includes a network logo. Traditionally, when the network logo disappears, this is an indication that there is a "commercial break" during which time an ad may be inserted. Accordingly, a broadcast ad 520 is traditionally inserted and broadcast to the same users as the program content. Upon completion of broadcasting the ad, the program content 510*a* reappears with the network logo.

According to an exemplary embodiment, targeted content may be inserted into the program content in a similar manner when a network logo disappears. For example, as shown in FIG. 5B, when the network logo no longer appears in program content 510*b*, indicating a break in the program content, targeted content 530*a* may be included and displayed to the user.

According to another embodiment, the targeted content may be inserted based on time codes included in the program content. For example, referring to FIG. 5C, program content 510*c* includes time codes indicating, on a timed basis, points in the program. As those skilled in the art will appreciate, time codes may be expressed in several forms, such as hours, minutes, and seconds. At a certain time during the program, represented in FIG. 5C by time code 00:20:00, a break in the program occurs. At this point, targeted content 530*b* may be included. After a time allotted for the targeted content 530*b*, which may be an ad or other targeted content, has elapsed, represented in FIG. 5C by another time code 00:22:00, the program content 510*c* resumes.

Figure 5B:
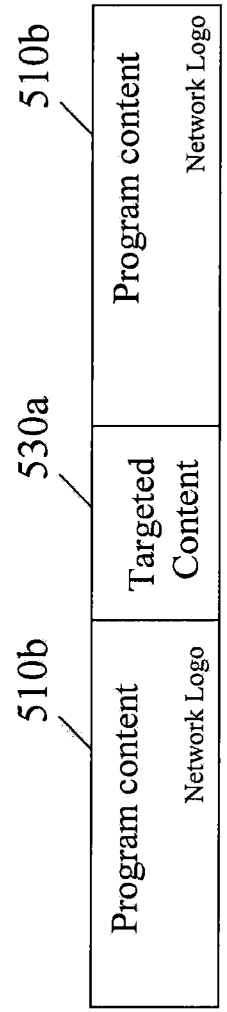
FIGS. 5B and 5C illustrate examples of how targeted content may be included in program content according to exemplary embodiments.
Figure 5C:
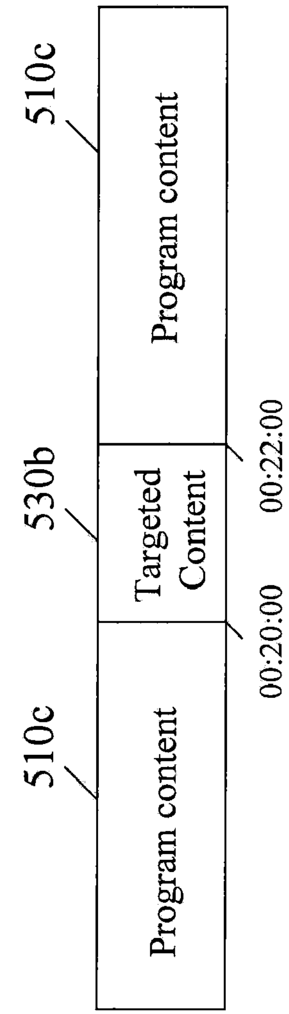

It should be appreciated that there may be other ways of including targeted content in program content, and the examples shown in FIGS. 5B and FIG. 5C are for illustrative purposes only. As another example, the targeted content may be inserted at certain times during a given day, e.g., near mealtime, or at times during which a certain program is scheduled to be shown.

Figure 6:
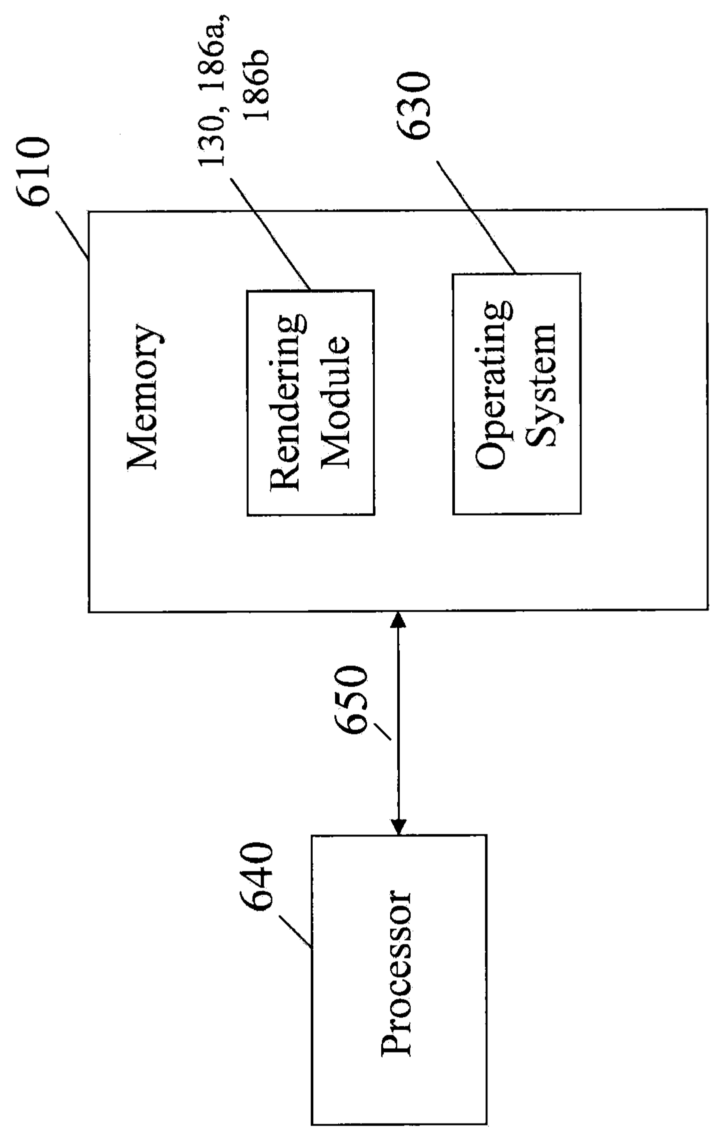
FIG. 6 is a block diagram illustrating a processor and a memory for rendering targeted content included in program content for presentation to a user according to exemplary embodiments.

FIG. 6 illustrates a processor and a memory hosted by a device, such as a server hosting the rendering module 130 shown in FIG. 1 or any of the user devices 180*a*, 180*b* shown in FIG. 3. A processor 640 and a memory 610 may be used according to exemplary embodiments for rendering advertisements and other targeted content along with program content for display (or other appropriate presentation). The processor 640 communicates with the memory 610 via, e.g., an address bus 650. The processor 640 may, for example, be a commercially available or customized microprocessor. The memory 610 is representative of the overall hierarchy of memory devices containing computer readable media and data used to execute operations for determining how targeted content is rendered into program content. The memory 610 may also contain other memory devices containing computer readable media and data used for other functions described above with regard to the user devices 180*a*, 180*b*. Thus, for example, the memory may include one or more memory devices including various components of the user devices 180*a*, 180*b*, such as the rendering modules 186*a*, 186*b*, the application interface agents 188*a*, 188*b*, and the local targeted content database 182*a*, 182*b*.

For simplicity of illustration, the memory 610 is shown as including only the rendering module 130, 186*a* or 186*b*. The memory 610 may also include an operating system 630 that, in the scenario in which the rendering module is hosted by the user device, controls operation of the user device and manages the device's resources and may coordinate execution of various programs by the processor 640. In the scenario in which the rendering module is hosted by a server, the operating system 630 controls operation of the server and may manage various resources and coordinate execution of various programs by the processor 640. The various processes performed by the rendering modules 130, 188*a*, 188*b* and other components of the user devices 180*a*, 180*b* or server hosting the rendering module 130 may be included as computer readable instructions executable by the processor 640. The memory 610 may include, but is not limited to, devices such as cache, ROM, PROM, EPROM, EEPROM, flash, SRAM and DRAM.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Furthermore, the use of the terms a, an, etc. do not denote a limitation of quantity, but rather denote the presence of at least one of the referenced item.

What is claimed:

1. A computer program product tangibly embodied on a non-transitory computer readable medium, for providing targeted content for advertising, the computer program product including instructions that, when executed by a computer, cause the computer to perform operations comprising:

receiving program content and the targeted content, wherein the targeted content is associated with user information stored in a database within a network;

locally storing the targeted content in a local database;

determining what time during and at what position in the program content to overlay the program content with the targeted content;

rendering the program content and the targeted content, with the targeted content included at the position determined in the program content, for presentation to a user;

reporting to a scanning module occasions in which the program content was overlaid with the target content, in order to charge an advertiser of the targeted content for the occasions; and to report the occasions to the scanning module providing a generic reporting of the program content overlaid with the targeted content without revealing the targeted content according a level of privacy in reporting the occasions, the generic reporting further includes reporting when the targeted content was included during the program content and reporting where the targeted content was included in the program content according to the level of privacy while not revealing the targeted content.

2. The computer program product of claim 1, wherein the position in the program content to include the targeted content is determined by identifying a portion of the program content containing advertising content;

wherein the advertising content is replaced with the targeted content;

wherein the occasions, reported to the scanning module, in which the program content was overlaid with the targeted content correspond to reporting at what point during the program content the targeted content is overlaid and reporting where in the program content that the targeted content is included, according to another level of privacy in reporting the occasions;

wherein the scanning module is for a network service provider.

3. The computer program product of claim 1, wherein a subject matter of the targeted content is a same as the program content;

determining at what time to include the targeted content in the program content by determining when the subject matter is playing during which to overlay the targeted content; and causing a sports logo of the targeted content to overlay a display of the subject matter being played by the program content;

wherein the sports logo of the targeted content is a commercial sports brand symbol and the subject matter is sports content such that the commercial sports brand symbol overlays the display of the sports content being played by the program content.

4. The computer program product of claim 3, further comprising causing a targeted content provider to be charged a flat rate each time the sports logo of the targeted content overlays the display of the subject matter being played by the program content.

5. The computer program product of claim 1, wherein the targeted content includes webpage content.

6. A computer program product tangibly embodied on a non-transitory computer readable medium, for providing targeted content for advertising, the computer program product including instructions that, when executed by a set top box, cause the set top box to perform operations comprising:

receiving program content and the targeted content, wherein the targeted content is associated with user information stored in a database within a network;

locally storing the targeted content in a local database;

determining what time during and at what position in the program content to overlay the program content with the targeted content;

rendering the program content and the targeted content, with the targeted content included at the position determined in the program content, for presentation to a user;

reporting to a scanning module occasions in which the program content was overlaid with the target content, in order to charge an advertiser of the targeted content for the occasions;

to report the occasions to the scanning module providing a generic reporting of the program content overlaid with the targeted content without revealing the targeted content according a level of privacy in reporting the occasions, the generic reporting by the set top box further includes reporting when the targeted content was included during the program content and reporting where the targeted content was included in the program content according to the level of privacy while not revealing the targeted content.

7. The computer program product of claim 6, wherein the position in the program content to overlay the targeted content is determined by identifying a portion of the program content containing advertising content, and wherein the advertising content is replaced with the targeted content.

8. The computer program product of claim 6, wherein a subject matter of the targeted content is a same as the program content; and wherein determining at what time to overlay the targeted content on the program content comprises determining when the subject matter is playing during which to overlay the targeted content.

9. The computer program product of claim 6, wherein rendering the program content and the targeted content occurs in the set top box.

10. The computer program product of claim 6, wherein the user information stored in the database within the network is updated with user information stored locally in the set top box.

11. The computer program product of claim 6, wherein the targeted content includes webpage content.

12. An apparatus for providing targeted content, the apparatus comprising:

a processor; and a non-transitory computer readable medium with computer-executable instructions stored thereon, that when executed by the processor cause the processor to perform operations comprising:

receiving program content and the targeted content, wherein the targeted content is associated with user information stored in a database within a network;

locally storing the targeted content in a local database;

determining what time during and at what position in the program content to overlay the program content with the targeted content;

rendering the program content and the targeted content, with the targeted content included at the position determined in the program content, for presentation to a user;

reporting to a scanning module occasions in which the program content was overlaid with the target content, in order to charge an advertiser of the targeted content for the occasions;

to report the occasions to the scanning module, providing a generic reporting of the program content overlaid with the targeted content without revealing the targeted content according a level of privacy in reporting the occasions, the generic reporting further includes reporting when the targeted content was included during the program content and reporting where the targeted content was included in the program content according to the level of privacy while not revealing the targeted content.

13. The apparatus of claim 12, wherein the position in the program content to include the targeted content is determined by identifying a portion of the program content containing advertising content, and wherein the advertising content is replaced with the targeted content.

14. The apparatus of claim 12, wherein a subject matter of the targeted content is a same as the program content; and wherein what time to overlay the targeted content in the program content comprises determining when the subject matter is playing during which to overlay the targeted content.

15. The apparatus of claim 12, wherein the targeted content includes webpage content.

* * * * *